(12) United States Patent
Yang

(10) Patent No.: US 8,297,636 B2
(45) Date of Patent: Oct. 30, 2012

(54) MANPOWER-DRIVEN DEVICE WITH BI-DIRECTIONAL INPUT AND CONSTANT DIRECTIONAL ROTATION OUTPUT

(76) Inventor: Tai-Her Yang, Dzan-Hwa (TW)

( * ) Notice: Subject to any disclaimer, the term of this patent is extended or adjusted under 35 U.S.C. 154(b) by 1055 days.

(21) Appl. No.: 12/219,029

(22) Filed: Jul. 15, 2008

(65) Prior Publication Data

US 2010/0013184 A1   Jan. 21, 2010

(51) Int. Cl.
*B62M 29/00* (2006.01)
(52) U.S. Cl. .......................................... 280/219
(58) Field of Classification Search .................. 280/241, 280/219
See application file for complete search history.

(56) References Cited

U.S. PATENT DOCUMENTS

| | | | | |
|---|---|---|---|---|
| 3,944,253 A * | 3/1976 | Ripley, III | ...................... | 280/238 |
| 4,061,046 A * | 12/1977 | Lang | ............................... | 474/70 |
| 4,701,152 A * | 10/1987 | Dutil et al. | ........................ | 474/70 |
| 5,121,936 A * | 6/1992 | Cowan | ............................ | 280/236 |
| 5,215,323 A * | 6/1993 | Cowan | ............................ | 280/236 |
| 5,772,225 A * | 6/1998 | Brackett | .......................... | 280/216 |
| 6,431,573 B1 * | 8/2002 | Lerman et al. | ................ | 280/261 |
| 6,555,928 B1 * | 4/2003 | Mizuno et al. | .............. | 290/40 C |
| 7,011,322 B2 * | 3/2006 | Beale | .............................. | 280/260 |
| 2002/0084618 A1 * | 7/2002 | Lerman et al. | ................ | 280/261 |
| 2004/0000206 A1 * | 1/2004 | Beale | ............................... | 74/150 |
| 2007/0197346 A1 * | 8/2007 | Seliber | ............................ | 482/57 |

* cited by examiner

*Primary Examiner* — Tashiana Adams

(74) *Attorney, Agent, or Firm* — Bacon & Thomas, PLLC

(57) ABSTRACT

The present invention is related to a manpower driven device being able to do particular bi-directional pedaling to provide constant directional output for driving the loading wheel train, wherein its pedaling direction is selected by the rider according to his/her operating statuses of the muscles and joints, or the same directional outputs of different speed ratios is made further through the different driving directional inputs.

15 Claims, 3 Drawing Sheets

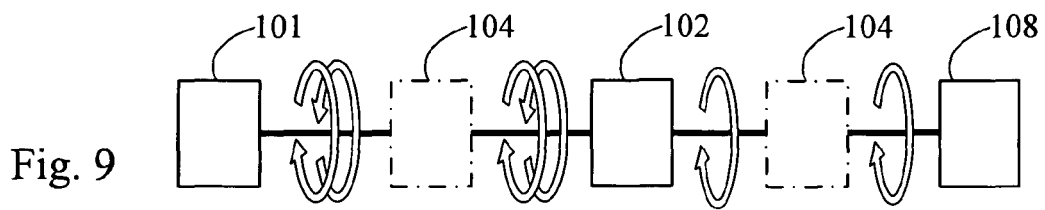
Fig. 9
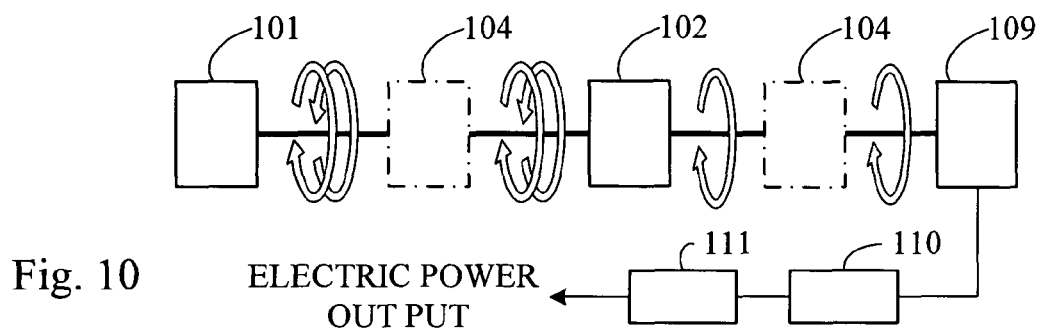
Fig. 10  ELECTRIC POWER OUT PUT
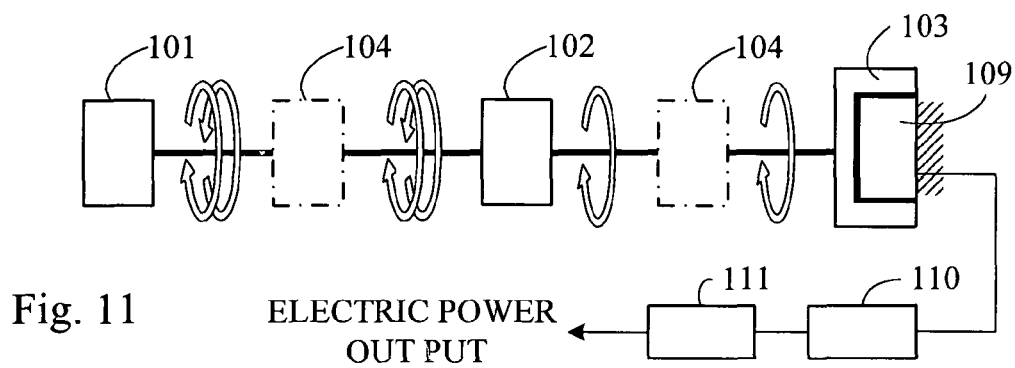
Fig. 11  ELECTRIC POWER OUT PUT
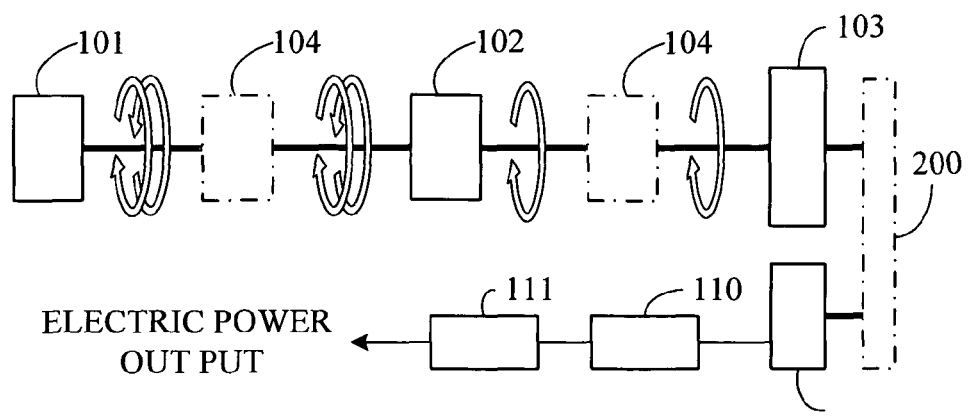
Fig. 12  ELECTRIC POWER OUT PUT

MANPOWER-DRIVEN DEVICE WITH BI-DIRECTIONAL INPUT AND CONSTANT DIRECTIONAL ROTATION OUTPUT

BACKGROUND OF THE INVENTION (a) Field of the invention

The present invention discloses a device being able to do bi-directional rotation of positive or reverse rotation by both or one of the human hand or foot for driving input end of the manpower-driven input device and further through output end of the manpower-driven input device to input end of the constant directional rotation output transmission device to provide constant directional rotation output via the output end of the constant directional rotation output transmission device for driving the loading wheel trains, wherein the present invention can be applied in bi-directional manpower-driven carriers including foot pedaling driven vehicles, or hand rotating driven vehicles, or both or one of the pedaling and hand rotating driven vehicles; or can be applied in bi-directional manpower-driven sport devices including foot pedaling driven sport devices, or hand rotating driven sport devices, or both or one of the pedaling and hand rotating driven sport devices; or can be applied in generally driven fluid pumps, or fans or generating devices including foot pedaling driven devices, or hand rotating driven devices, or both or one of the pedaling and hand rotating vehicles driven devices.

(b) Description of the Prior Art

We all know that the bicycle rider is always pedaling in constant directions using the relevant muscles and joints are periodically and constantly; i.e part of the muscles and joints of pedaler's body are always at force exerting and receiving statuses, while the other part of muscles and joints of the pedaler's body are always at non-force exerting and receiving statuses; therefore, loading on the human body is unevenly distributed, and the rider may incur sport hazard due to tiredness of longtime stepping movement.

SUMMARY OF THE INVENTION

The present invention discloses a manpower-driven device having a particular man-power driven device being able to do bi-directional rotational input having its output ends for providing output to the input ends of the constant directional rotation output transmission device, while the constant rotating directional output is used to drive the loading wheel train via the output end of the constant directional rotation output transmission device, wherein directional driving input can be freely selected by the user, or the constant rotating directional output of different rotational speed ratios in different directions of driving inputs can be made via the constant directional rotation output transmission devices of different transmission speed ratios.

BRIEF DESCRIPTION OF THE DRAWINGS

FIG. 9 is a structural block schematic view of the mechanical functioning device of the invention being driven in constant directional rotation.

FIG. 10 is a structural block schematic view of the invention for driving the power generator.

FIG. 11 is a structural block schematic view of the integrally combined structure of the driven loading wheel train (103) and the power generator (109) of the invention.

FIG. 12 is a structural block schematic view of the invention showing that loading wheel train (103) of manpower driven carrier is equipped with the power generator (109).

DESCRIPTION OF MAIN COMPONENT SYMBOLS

Figure 1:
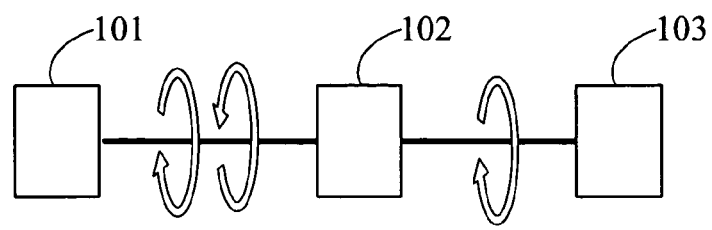
FIG. 1 is a basic block schematic view of the manpower driving device of the invention with bi-directional input and constant rotating directional output.

101: Manpower input device
102: Constant directional rotation output transmission device
103: Loading wheel train
104, 200: Transmission device
105: Externally installed operatively controllable damping device
106: Loading wheel train of fixed damping
107: Loading wheel train of operatively controllable damping
108: Rotation type mechanical functioning device
109: Power generator set
110: Operative control device relative to power generator
111: Circuit switch and protective device
112: Externally installed fixed damping device

DETAILED DESCRIPTION OF THE PREFERRED EMBODIMENTS

The present invention discloses a device being able to do bi-directional rotation of positive or reverse rotation by both or one of the human hand or foot for driving input end of the manpower-driven input device and further through output end of the manpower-driven input device to input end of the constant directional rotation output transmission device to provide constant directional rotation output via the output end of the constant directional rotation output transmission device for driving the loading wheel trains, wherein the present invention can be applied in bi-directional manpower-driven carriers including foot pedaling driven vehicles, or hand rotating driven vehicles, or both or one of the pedaling and hand rotating driven vehicles; or can be applied in bi-directional manpower-driven sport devices including foot pedaling driven sport devices, or hand rotating driven sport devices, or both or one of the pedaling and hand rotating driven sport devices, or can be applied in generally driven fluid pumps, or fans or generating devices including foot pedaling driven devices, or hand rotating driven devices, or both or one of the pedaling and hand rotating vehicles driven devices.

The present invention discloses a manpower-driven device having a particular man-power driven device being able to do bi-directional rotational input having its output ends for providing output to the input ends of the constant directional rotation output transmission device, while the constant rotating directional output is used to drive the loading wheel train via the output end of the constant directional rotation output transmission device, wherein directional driving input can be freely selected by the user, or the constant rotating directional output of different rotational speed ratios in different directions of driving inputs can be made via the constant directional rotation output transmission devices of different transmission speed ratios.

FIG. 1 is a basic block schematic view of the manpower driving device of the invention with bi-directional input and constant rotating directional output.

Figure 2:
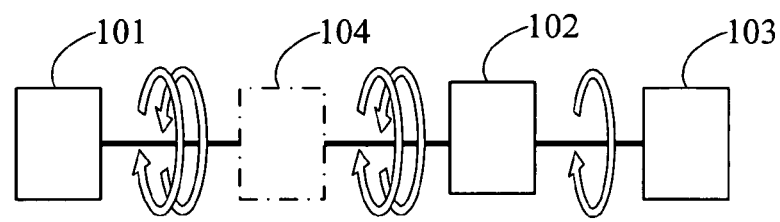
FIG. 2 is a block schematic view showing that the driving device in FIG. 1 is additionally installed with a transmission device (104) between the manpower input device (101) and constant directional rotation output transmission device (102).

FIG. 2 is a block schematic view showing that the driving device in FIG. 1 is additionally installed with a transmission device (104) between the manpower input device (101) and constant directional rotation output transmission device (102).

Figure 3:
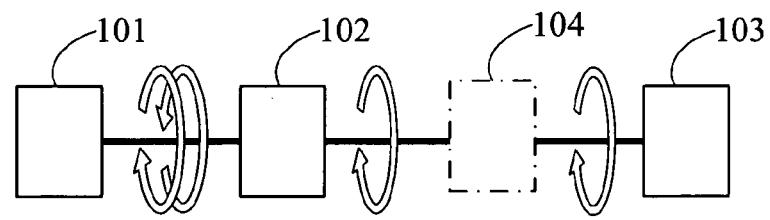
FIG. 3 is a block schematic view showing that the driving device in FIG. 1 is additionally installed with a transmission device (104) between constant directional rotation output transmission device (102) and the driven loading wheel train (103).

FIG. 3 is a block schematic view showing that the driving device in FIG. 1 is additionally installed with a transmission device (104) between constant directional rotation output transmission device (102) and the driven loading wheel train (103).

Figure 4:
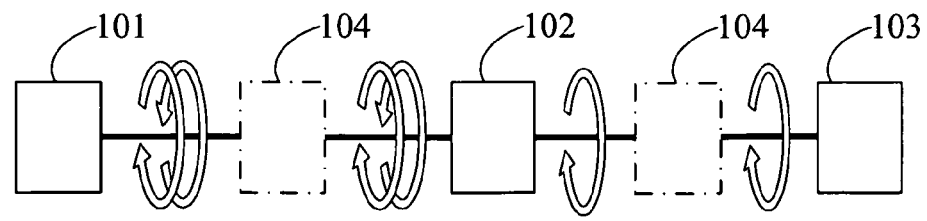
FIG. 4 is a block schematic view showing that the driving device in FIG. 1 is additionally installed with a transmission device (104) between manpower input device (101) and constant directional rotation output transmission device (102) as well as between constant directional rotation output transmission device (102) and the driven loading wheel train (103).

FIG. 4 is a block schematic view showing that the driving device in FIG. 1 is additionally installed with a transmission device (104) between manpower input device (101) and constant directional rotation output transmission device (102) as well as between constant directional rotation output transmission device (102) and the driven loading wheel train (103).

For the manpower driving device with bi-directional input and constant rotating directional output, the manpower input device (101) is driven by both or one of the human hand or foot in the first driven rotating direction or in the second driven rotating direction of contrary rotating direction, wherein the rotational energy output from output end of the manpower input device (101) is directly provided or through transmission device (104) to provide to the input end of constant directional rotation output transmission device (102), and the rotational energy output in constant rotating direction from output end of constant directional rotation output transmission device (102) is used to drive the loading wheel train (103) as shown in FIG. 1~FIG. 4, wherein:

The manpower input device (101): It receives the positive or reverse bi-directional rotation or reciprocation driving input by both or one of the hand or foot of human body to produce the selected speed ratio as well as to be constituted by corresponding positive or reverse bi-directional rotation output mechanism comprising the pedal, crankshaft and bi-directional rotation transmission wheel train, or comprising the handle, handle shaft, and bi-directional rotation transmission wheel train, or comprising the conventional manpower-driven bi-directional rotation mechanism device.

The input power for the energy to drive the first driven rotating direction or the second driven rotating direction comes from both or one of the human hand or foot for driving the input end of the manpower input device (101).

The first driven rotating direction is contrary to the second driven rotating direction.

The constant directional rotation output transmission device (102): The constant rotating directional transmission device (102) directly receives or is through transmission device (104) to receive different rotating directional energy from manpower input device (101) so as to provide constant rotating directional power output; wherein the internal transmission component of constant directional rotation output transmission device (102) are constituted by one or more than one transmission components of the 1) gear train; or 2) friction wheel train; or 3) chain and chain sprocket train; or 4) belt and belt wheel train; or 5) transmission crankshaft and wheel train; or 6) fluid transmission device; or 7) electromagnetic transmission device, etc., wherein if constant rotating directional transmission device (102) is driven by the inputs of the first driven rotating direction and second driven rotating direction in different rotating directions, the speed ratio of the constant directional rotation between the one at input end and the one at the output end is the same or different or a variable speed ratio.

The loading wheel train (103): It is the wheel train type load being directly driven by the constant directional rotation output transmission device (102) or being driven in the single constant directional rotation via the transmission device (104).

The transmission device (104): The transmission device (104) is constituted by the automatic or manually operated stepped or stepless variable speed transmission device.

The manpower driven device with bi-directional input and constant directional rotation output includes the application for bi-directional rotation manpower driven carrier being driven by both or one of the human hand or foot, wherein the bi-directional rotation energy output of the manpower input device (101) being driven by both or one of the human hand or foot for positive or reverse rotation is directly provided or provided via transmission device (104) to at least one constant directional rotation output transmission device (102), and the loading wheel train (103) is directly driven or driven via transmission device (104) by the constant directional rotation output power from the output end of the constant directional rotation output transmission device (102); wherein the transmission device (104) is constituted by the automatically or manually operated stepped or stepless variable speed device, while the manpower input device (101) is driven by both or one of the human hand or foot for positive or reverse rotation to provide output of relative directional rotation at selected speed ratio.

The manpower driven device with bi-directional input and constant directional rotation output being applied in manpower driven carriers is constituted by the manpower driven carriers having the wheel train including foot pedaling driven vehicles, or hand rotating driven vehicles, or both foot pedaling and hand rotating driven vehicles to drive the manpower input device (101) for positive or reverse rotation by both or one of the human hand or foot, and further output positive or reverse rotational energy from the output end is further directly provided or provided via transmission device (104) to the input end of constant directional rotation output transmission device (102), and then the loading wheel train (103) is therefore directly driven or driven via transmission device (104) by the rotational energy output of the constant directional rotation output from the output end of the constant directional rotation output transmission device (102) to further drive the carrier being combined with loading wheel train (103), wherein the transmission device (104) includes the constitution of automatically or manually operated stepped or stepless variable speed devices.

Figure 5:
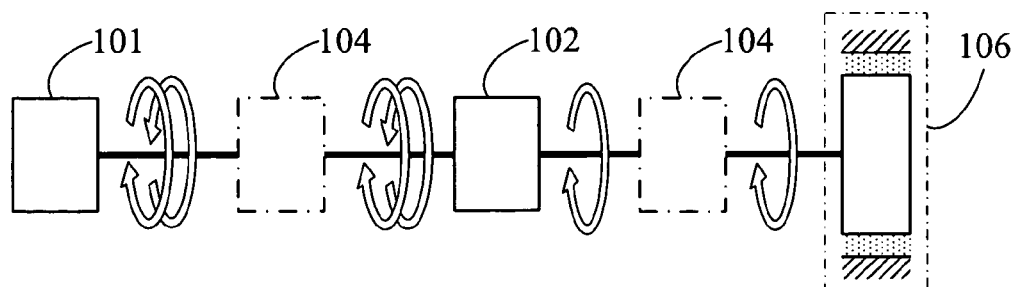
FIG. 5 is a structural block schematic view of the invention being applied in a manpower driven sport device having loading wheel train of fixed damping.

The manpower driven device with bi-directional input and constant directional rotation output can be further applied in manpower driven sport devices, such as health exercise bicycles, such as that FIG. 5 is a structural block schematic view of the invention being applied in a manpower driven sport device having loading wheel train of fixed damping, wherein it includes the constitution of the manpower input device (101) being driven by both or one of the human hand or foot for positive or reverse rotation and having at least one constant directional rotation output transmission device (102) with the input ends whereof to directly receive or through transmission device (104) to receive the rotational energy output from manpower input device (101), so that loading wheel train of fixed damping (106) is therefore directly driven or driven via transmission device (104) by the rotational energy output of the constant directional rotation output from the output end of the constant directional rotation output transmission device (102), wherein the transmission device (104) includes the constitution of automatically or manually operated stepped or stepless variable speed devices, while the loading wheel train of fixed damping (106) has a fixed damping for production during operation of the sport device;

The fixed damping of aforesaid loading wheel train of fixed damping (106) includes the constitutions of friction type, fluid type, counter-torque of power generation output type, electrical counter-torque type, or electromagnetic eddy current generating type fixed damping structures, etc.

Figure 6:
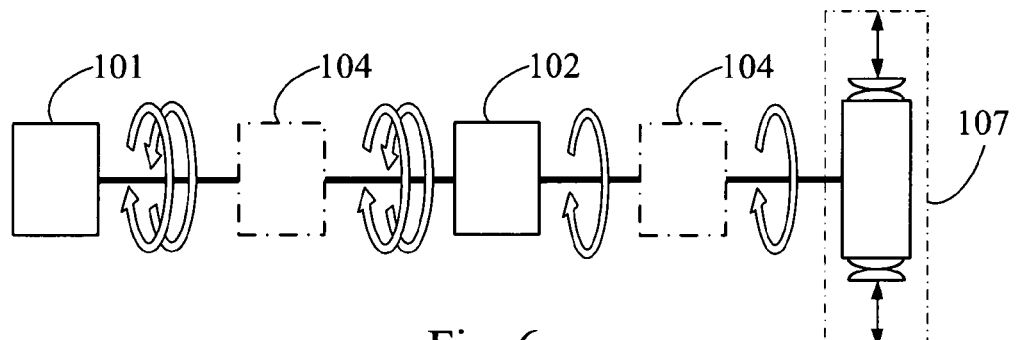
FIG. 6 is a structural block schematic view of the invention being applied in a manpower driven sport device having loading wheel trains with operatively controllable damping.

The manpower driven device with bi-directional input and constant directional rotation output can be further applied in manpower driven sport devices having operatively controllable damping devices, such as health exercise bicycles, as illustrated in FIG. 6 is a structural block schematic view of the invention being applied in a manpower driven sport device having loading wheel trains with operatively controllable damping, wherein it includes the constitution of the manpower input device (101) being driven by both or one of the human hand or foot and having at least one constant directional rotation output transmission device (102) with the input ends whereof to directly receive or through transmission device (104) to receive the rotational energy output from the manpower input device (101), so that the loading wheel train with operatively controllable damping (107) is therefore directly driven or driven via transmission device (104) by the rotational energy output of the constant directional rotation output from the output end of the constant directional rotation output transmission device (102), wherein the transmission device (104) includes the constitution of automatically or manually operated stepped or stepless variable speed devices, while the loading wheel train with operatively controllable damping (107) has the operative control function to produce operatively controllable damping function during operation of the sport device;

The operatively controllable damping of aforesaid loading wheel train with operatively controllable damping (107) includes the constitutions of friction type, fluid type, counter-torque of power generation output type, electrical counter-torque type, or electromagnetic eddy current generating type damping structures having operative control functions, etc. for operatively controlling the damping of loading wheel train with operatively controllable damping (107).

The aforesaid loading wheel train with operatively controllable damping (107) is operatively controlled by fluidic, mechanical or electrical power to produce the operatively controllable damping functions according to the type of selected damping structure.

Figure 7:
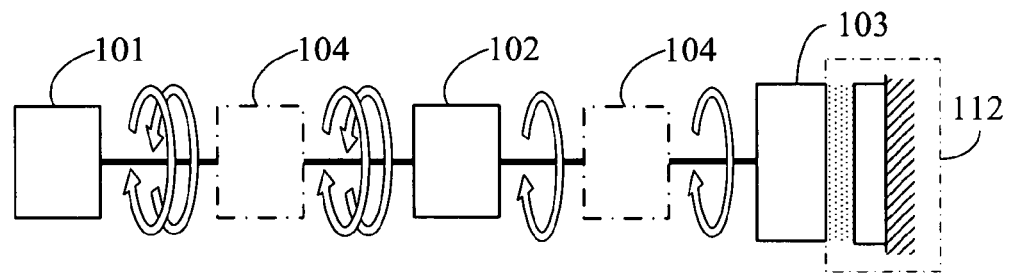
FIG. 7 is a structural block schematic view of the invention being applied in a manpower driven carrier which is externally installed with a fixed damping device for producing damping thereby constituting sport device functions.

The manpower driven device with bi-directional input and constant directional rotation output is through additionally externally installed with the fixed damping device (112) on the manpower driven carrier to produce damping effect on the loading wheel train (103) for conversion to sport device functions use; such as that FIG. 7 is a structural block schematic view of the invention being applied in a manpower driven carrier which is externally installed with a fixed damping device for producing damping thereby constituting sport device functions, wherein it includes the constitution of the manpower input device (101) being driven by both or one of the human hand or foot and having at least one constant directional rotation output transmission device (102) with the input ends whereof to directly receive or through transmission device (104) to receive the rotational energy output from the manpower input device (101), so that the loading wheel train (103) is therefore directly driven or driven via transmission device (104) by the rotational energy output of the constant directional rotation output from output end of the constant directional rotation output transmission device (102), wherein the transmission device (104) includes the constitution of automatically or manually operated stepped or stepless variable speed devices, while the loading wheel train (103) is additionally externally installed with at least one fixed damping device (112) for producing damping during the sport device functional operation.

The damping structure of the externally installed fixed damping device (112) on the loading wheel train (103) for producing damping effect includes the constitutions of friction type, fluid type, counter-torque of power generation output type, electrical counter-torque type, or electromagnetic eddy current generating type damping structures with operatively controllable characteristics, etc.

Figure 8:
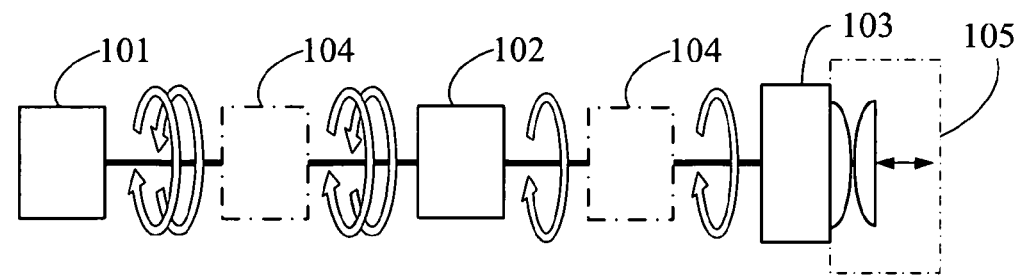
FIG. 8 is a structural block schematic view of the invention being applied in a manpower driven carrier which is externally installed with an operatively controllable damping device (105) thereby constituting sport device functions.

The manpower driven device with bi-directional input and constant directional rotation output is through externally installed with an operatively controllable damping device (105) on the manpower driven carrier for conversion to sport device functional use; such as that FIG. 8 is a structural block schematic view of the invention being applied in a manpower driven carrier which is externally installed with an operatively controllable damping device (105) thereby constituting sport device functions, wherein it includes the constitution of the manpower input device (101) being driven by both or one of the human hand or foot and having at least one constant directional rotation output transmission device (102) with the input ends whereof to directly receive or through transmission device (104) to receive the rotational energy output from the manpower input device (101), so that the loading wheel train (103) is therefore directly driven or driven via transmission device (104) by the rotational energy output of the constant directional rotation output from output end of the constant directional rotation output transmission device (102), wherein the transmission device (104) includes the constitution of automatically or manually operated stepped or stepless variable speed devices, while the loading wheel train (103) is externally installed with at least one operatively controllable damping device (105) for producing operatively controllable damping during the sport device functional operation;

The damping structure of the externally installed operatively controllable damping device (105) includes the constitutions of friction type, fluid type, counter-torque of power generation output type, electrical counter-torque type, or electromagnetic eddy current generating type damping structures with operatively controllable characteristics, etc., wherein damping capacity during sport device functional operation is operatively controlled via the fluidic, mechanical or electrical operative control methods and devices by the externally installed operatively controllable damping device (105) according to the type of selected damping structure.

The manpower driven device with bi-directional input and constant directional rotation output is through manpower to provide positive or reserve rotational energy to the input end of the manpower input device (101), and the rotational energy from the output end of the manpower input device (101) is transmitted to the input end of the constant directional rotation output transmission device (102), while the mechanical output power in constant rotating direction being exported from output end of the constant directional rotation output transmission device (102) is used to drive the mechanical functioning device in constant rotating direction, such as that FIG. 9 is a structural block schematic view of the mechanical functioning device of the invention being driven in constant directional rotation, wherein it includes the constitution of the manpower input device (101) being driven by both or one of the human hand or foot for positive or reverse rotation and having the constant directional rotation output transmission device (102) with the input end whereof to directly receive or through transmission device (104) to receive the rotational energy output from the manpower input device (101), so that the rotating type mechanical functioning device (108) such as fluid pump, fan or flywheel of inertia storage or other manpower driven rotating type mechanical functioning device (108) is therefore directly driven or driven via transmission device (104) by the constant directional rotation output from output end of the constant directional rotation output transmission device (102), wherein the transmission device (104) includes the constitution of automatically or manually operated stepped or stepless variable speed devices.

The manpower driven device with bi-directional input and constant directional rotation output is further through manpower to provide positive or reserve rotational energy to the input end of the manpower input device (101), and the rotational energy output from the output end of the manpower input device (101) is transmitted to the input end of the constant directional rotation output transmission device (102), while constant directional rotation output being exported from the output end of the constant directional rotation output transmission device (102) is used to drive the power generator (109), such as that FIG. 10 is a structural block schematic view of the invention for driving the power generator, wherein it includes the constitution of the manpower input device (101) being driven by both or one of the human hand or foot for positive or reverse rotation and having the constant directional rotation output transmission device (102) with the input end whereof to directly receive or through transmission device (104) to receive the rotational energy output from the manpower input device (101), so that rotating type power generator (109) is therefore directly driven or driven via transmission device (104) by the constant directional rotation output from output end of the constant directional rotation output transmission device (102), wherein the transmission device (104) includes the constitution of automatically or manually operated stepped or stepless variable speed A manpower driving device with bi-directional input and constant rotating directional output as claimed in claim 1 devices, while the power generator (109) can be further optionally installed with relevant operative control device (110) and electrical circuit switches or protective devices (11) as needed.

The manpower driven device with bi-directional input and constant directional rotation output being applied for driving the power generator (109) further includes an integrally combined structure of the loading wheel train (103) and the power generator (109), such as that FIG. 11 is a structural block schematic view of the integrally combined structure of the driven loading wheel train (103) and the power generator (109) of the invention, wherein it includes the constitution of the manpower input device (101) being driven by both or one of the human hand or foot for positive or reverse rotation and having the constant directional rotation output transmission device (102) with the input end whereof to directly receive or through transmission device (104) to receive the rotational energy output from the manpower input device (101), so that the power generator (109) being integrally combined with loading wheel train (103) or having loading wheel train (103) being a part of the power generator structure is therefore directly driven or driven via transmission device (104) by the constant directional rotation output from output end of the constant directional rotation output transmission device (102), wherein the transmission device (104) includes the constitution of automatically or manually operated stepped or stepless variable speed devices, while the power generator (109) can be further optionally installed with relevant operative control device (110) and electrical circuit switches or protective devices (111) as needed.

The manpower driven device with bi-directional input and constant directional rotation output being used for manpower driven carrier is further installed with the power generator (109) which is directly driven or driven via transmission device (200) by the loading wheel train (103), such as that FIG. 12 is a structural block schematic view of the invention showing that loading wheel train (103) of manpower driven carrier is equipped with the power generator (109), wherein it includes the constitution of the manpower input device (101) being driven by both or one of the human hand or foot for positive or reverse rotation and having the constant directional rotation output transmission device (102) with the input end whereof to directly receive or through transmission device (104) to receive the rotational energy output from the manpower input device (101), so that the loading wheel train (103) is driven by the constant directional rotation output from the output end of the constant directional rotation output transmission device (102) to further drive the power generator (109) being externally installed for being driven by the loading wheel train (103), wherein the transmission device (104) includes the constitution of automatically or manually operated stepped or stepless variable speed devices, while the power generator (109) can be further optionally installed with relevant operative control device (110) and electrical circuit switches or protective devices (111) as needed.

The manpower-driven device of bi-directional input and constant directional rotation output being used as the bi-directional manpower-driven carrier, bi-directional manpower-driven sport device, or bi-directional manpower-driven rotating type mechanical functioning device, or bi-directional manpower-driven power generator is further optionally additionally installed with the displaying device of relevant operating functions; or the detector device on or displaying device of operator's psychological condition according to properties of the driven load.

The invention claimed is:
1. A human-powered driving device having a bi-directional input and a constant rotating direction output, comprising:
   a human foot or hand driven input device for receiving a rotary input in either of two directions or a reciprocating rotary input, including (a) a pedal, a crank, and a driving wheel set, or (b) a handle, a handle shaft, and a driving wheel set;

a constant output direction transmission device for receiving a bi-directional input from the input device and producing a constant direction output having only one rotational direction, wherein the constant output direction transmission device includes transmission components constituted by at least one of a gear set, a friction wheel set, a chain and sprocket section, a belt and pulley section, a transmission crank and wheel set, a fluid transmission unit, and an electromagnetic force actuator, and wherein a speed ratio between an input end and an output end of the constant output direction transmission device is fixed or variable; and a load connected to receive the output of the constant output direction transmission device.

2. A human-powered driving device as claimed in claim 1, further comprising an automatically or manually operated, stepped or stepless input transmission device connected between the human foot or hand driven input device and the constant output direction transmission device.

3. A human-powered driving device as claimed in claim 1, further comprising an automatically or manually operated, stepped or stepless output transmission device connected between the constant output direction transmission device and the load.

4. A human-powered driving device as claimed in claim 1, further comprising automatically or manually operated, stepped or stepless input transmission devices respectively connected (a) between the human foot or hand driven input device and the constant output direction transmission device, and (b) between the constant output direction transmission device and the load.

5. A human-powered driving device as claimed in claim 1, wherein the load is a loading wheel set.

6. A human-powered driving device as claimed in claim 5, wherein the loading wheel set includes wheels of a bicycle.

7. A human-powered driving device as claimed in claim 1, wherein the load includes a fixed damping structure comprising one of a friction type, fluid type, power generation type, electrical counter-torque type or electromagnetic eddy current generating type damping structure.

8. A human-powered driving device as claimed in claim 1, wherein the load includes an operatively controllable damping device comprising one of a friction type, fluid type, power generation type, electrical counter-torque type or electromagnetic eddy current generating type damping device, said operatively controllable damping device being controlled by fluidic, mechanical or electrical power.

9. A human-powered driving device as claimed in claim 8, wherein the load further includes a loading wheel train externally installed with said operatively controllable damping device.

10. A human-powered driving device as claimed in claim 1, wherein the load including a loading wheel train and a fixed damping device comprising one of a friction type, fluid type, power generation type, electrical counter-torque type or electromagnetic eddy current generating type damping structure.

11. A human-powered driving device as claimed in claim 1, wherein the load is a mechanical device.

12. A human-powered driving device as claimed in claim 11, wherein the mechanical device is selected from a fluid pump, fan, or flywheel.

13. A human-powered driving device as claimed in claim 1, wherein the load includes an electrical power generator.

14. A human-powered driving device as claimed in claim 13, wherein the load further includes a loading wheel train with which the electrical power generator is integrally combined.

15. A human-powered driving device as claimed in claim 13, further comprising a loading wheel train and additional transmission device for driving the electrical power generator.

* * * * *